(12) United States Patent
Barazandeh et al.

(10) Patent No.: US 12,452,298 B2
(45) Date of Patent: Oct. 21, 2025

(54) SYSTEMS AND METHODS FOR LOGIN ANOMALY DETECTION WITH INTEGRATED FEEDBACK

(71) Applicant: Fortinet, Inc., Sunnyvale, CA (US)

(72) Inventors: Babak Barazandeh, Sunnyvale, CA (US); Partha Bhattacharya, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 185 days.

(21) Appl. No.: 18/237,155

(22) Filed: Aug. 23, 2023

(65) Prior Publication Data
US 2025/0071141 A1    Feb. 27, 2025

(51) Int. Cl.
*H04L 9/40*    (2022.01)

(52) U.S. Cl.
CPC ........ *H04L 63/145* (2013.01); *H04L 63/1425* (2013.01)

(58) Field of Classification Search
CPC .................... H04L 63/145; H04L 63/1425
See application file for complete search history.

(56) References Cited

U.S. PATENT DOCUMENTS

| | | | |
|---|---|---|---|
| 9,231,962 B1 * | 1/2016 | Yen | H04L 63/1425 |
| 10,230,522 B1 * | 3/2019 | Roths | H04L 67/12 |
| 10,523,609 B1 * | 12/2019 | Subramanian | H04L 51/08 |
| 10,609,059 B2 | 3/2020 | Apostolopoulos et al. | |
| 10,673,880 B1 | 6/2020 | Pratt et al. | |
| 11,204,952 B2 | 12/2021 | Wang et al. | |
| 11,258,807 B2 | 2/2022 | Muddu et al. | |
| 2012/0233662 A1 * | 9/2012 | Scott-Cowley | H04L 51/04 709/204 |
| 2018/0248896 A1 * | 8/2018 | Challita | G06F 21/554 |
| 2022/0067160 A1 * | 3/2022 | Mammadli | G06F 16/21 |
| 2023/0362194 A1 * | 11/2023 | Lai | H04L 63/1491 |

* cited by examiner

*Primary Examiner* — Farid Homayounmehr
*Assistant Examiner* — Mudasiru K Olaegbe
(74) *Attorney, Agent, or Firm* — Law Office of Dorian Cartwright; Dorian Cartwright (57) ABSTRACT

Systems, devices, and methods are discussed for detecting and/or mitigating the spread of computer malware in a network environment.

18 Claims, 10 Drawing Sheets

FIG. 3B $W_{3-C}$ = Total Number of Accesses of User 3 to Computer C Divided By Total Number of Accesses by User 3 to All of Computers A-C

SYSTEMS AND METHODS FOR LOGIN ANOMALY DETECTION WITH INTEGRATED FEEDBACK

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2023, Fortinet, Inc.

FIELD

Embodiments discussed generally relate to network monitoring, and more particularly to systems and methods for detecting and/or mitigating the spread of computer malware in a network environment.

BACKGROUND

The complexity of network security has increased over time with computer malware that not only infects a target device, but has evolved to transfer a malicious executable to other devices. Such a transfer from one infected device to another typically begins with a login attempt made from the infected device to another target device. This may include the infected computer executing numerous brute force login attempts login credential harvested from the infected computer. An infected computer may attempt to login to any live computer in a network allowing the infection to spread rapidly and with potentially devastating effect.

Thus, there exists a need in the art for more advanced approaches, devices and systems for detecting and mitigating the spread of computer malware within a network environment.

SUMMARY

Various embodiments provide systems and methods for detecting and/or mitigating the spread of computer malware in a network environment.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-Case letter is associated with a reference numeral to denote one of multiple similar components. When reference is made to a reference numeral without specification to an existing sub-label, it is intended to refer to all such multiple similar components.

DETAILED DESCRIPTION

Various embodiments provide systems and methods for detecting and/or mitigating the spread of computer malware in a network environment.

Some embodiments discussed herein provide rely upon a machine learning model to detect anomalous login attempts. In some such embodiments, only login information is used in training and operating the machine learning model, and there is no need for additional side information such as, for example, Microsoft™ Active Directory™ groups.

It has been found that systems attempting to thwart computer network infections by detecting login failures that exceed a defined threshold within a defined time-period are relatively easy to avoid. Such avoidance can be achieved by spreading an attempt at brute force login over a long period and thereby not exceeding the threshold within the defined period. The approach of detecting excessive login attempts can be strengthened by dynamically defining the defined threshold, however, the weakness remains. It has further been found that use of the discovery of user peer groups from external information sources such as, for example, Microsoft™ Active Directory™ and then identifying anomalous logins when a user accesses a computer that is not typically accessed by user's peer group is not only computationally expensive in large networks, but also must be repeated frequently to assure it remains relevant. Furthermore, peer group definitions may not be comprehensive to cover all user groups and usage patterns. So, this method is not robust enough to catch all login anomalies.

Some embodiments utilize a system log to generate a bipartite graph representing a communication pattern between users in a network. From this bipartite graph a similarity score is developed for every pair of users within a network, and these similarity scores are used to detect anomalous logins within the network indicative of a potential malware threat. Of just some of many advantages achievable, by establishing behavioral patterns of users based upon data that is constantly updating, there are no need for assumptions that can be predicted by malware, and thus used to overcome the security features. Further, because embodiments are not reliant upon peer group information, the embodiments are not sensitive to measures such as internet protocol (IP) address that can be easily modified and thus used to overcome the security features.

In some embodiments, the anomaly detection is unsupervised. As such there is no need for a user to provide labeling information. Various embodiments can be created that allow for breaking a large problem into many smaller sub-problems, and as such the systems are efficient. Some embodiments include momentum-based training that further enhance robustness by reducing chain attacks. Various embodiments provide an ability to incorporate user feedback that, while not necessary for operation, can be used to reduce rates of false positives. In some embodiments, the scoring schema is tailored to a specific user's communication pattern. As a result, frequent users and/or computers are treated different from uncommon users and/or computers.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-Chip (SoC) processor that combines a CPU, a CP and an NP. Mid-range network security devices may include a multi-Core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which example embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for reducing the spread of malware between network devices in a network. Such methods include: receiving, by a processor, a request to login to an access node, wherein the request to login identifies a requesting user; identifying, by the processor, multiple users in addition to the requesting user that have accessed the access node; applying, by the processor, a random walk with restart algorithm to edge weights between at least ten of the multiple users in addition to the requesting user and at least ten access nodes to determine a login attempt score for the request to login; and denying, by the processor, the request to login based at least in part upon the login attempt score.

In some instances of the aforementioned embodiments, the access node is one of multiple access nodes in a network, and wherein each of the access nodes are one a network accessible device, or a network accessible service. In various instances of the aforementioned embodiments, denying the request to login based upon the login attempt score is done because the login attempt score is found to be dissimilar to prior login attempt scores between other users and the computer. In some instances of the aforementioned embodiments, denying the request to login based upon the login attempt score is done because the login attempt score is less than a defined threshold.

In various instances of the aforementioned embodiments, the random walk with restart algorithm includes a vector mask, and wherein the vector mask initially masks all users except for the requesting user. In some such instances, the methods further include: receiving, by the processor, an anomaly indication, wherein the anomaly indication identifies the denied request to login as improperly denied; and based at least in part on the anomaly indication, modifying the vector mask to mask all users except for the requesting user and at least one other user. In some cases, the at least one other user adds at least one additional restart point in the random walk with restart algorithm.

In some instances of the aforementioned embodiments, the methods further include: generating, by the processor, a bipartite graph including a first number of users and a second number of access nodes; calculating, by the processor, new edge weights for the bipartite graph, where the edge weights include an edge weight for each user-access node pair, and wherein each computer-access node pair includes one user from the first number of users and one access node from the second number of computers; calculating, by the processor, updated edge weights based upon a combination of the new edge weights and prior edge weights. In some such instances, the new edge weights are calculated as an estimated transition probability between respective elements in the bipartite graph. In various such instances, the new edge weights are calculated based upon a first set of login data and the prior edge weights are based upon a second set of login data, and wherein the second set of login data preceded the first set of login data. In some such instances, calculating the updated edge weights based upon the combination of the new edge weights and prior edge weights includes weighting the new edge weights relative to the prior edge weights.

Other embodiments provide systems for reducing the spread of malware between network devices in a network. Such systems include: a processing resource and a non-transient computer readable medium coupled to the processing resource. The non-transient computer readable medium has stored therein instructions that when executed by the processing resource cause the processing resource to perform the following method: receiving a request to login to an access node, wherein the request to login identifies a requesting user; identifying multiple users in addition to the requesting user that have accessed the access node; applying a random walk with restart algorithm to edge weights between at least ten of the multiple users in addition to the requesting user and at least ten access nodes to determine a login attempt score for the request to login; and denying the request to login based at least in part upon the login attempt score being dissimilar to prior login attempt scores between other users and the computer.

Yet other embodiments provide non-transient computer readable media having stored therein instructions that when executed by the processing resource cause the processing to perform the following method: receiving a request to login to an access node, wherein the request to login identifies a requesting user; identifying multiple users in addition to the requesting user that have accessed the access node; applying a random walk with restart algorithm to edge weights between at least ten of the multiple users in addition to the requesting user and at least ten access nodes to determine a login attempt score for the request to login; and denying the request to login based at least in part upon the login attempt score being dissimilar to prior login attempt scores between other users and the computer.

Figure 1A:
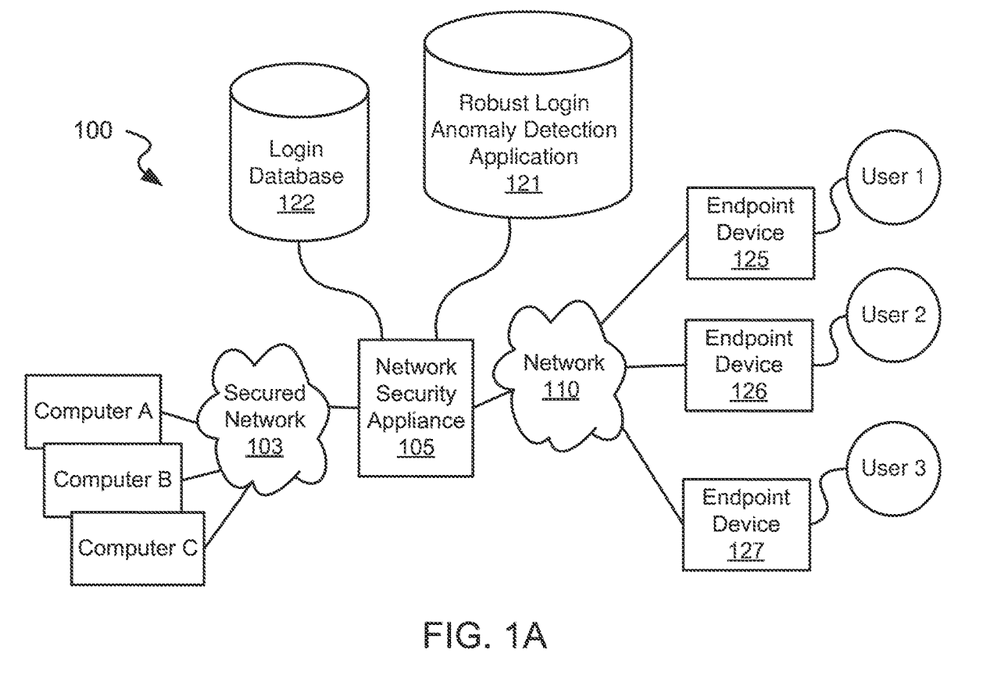
FIGS. 1A-1C illustrate a network architecture supporting automated malware detection and mitigation using robust anomaly detection in accordance with some embodiments.

Turning to FIG. 1A, a network architecture 100 supporting automated malware detection and mitigation using robust anomaly detection in accordance with some embodiments. As shown, network architecture 100 includes a network security appliance 105 with access to a login database 122 used to authenticate user's accessing computers within a secured network 103. Secured network 103 may be any communication systems or collection of communication systems that provide for network communications between respective networks. Those skilled in the art will appreciate that, secured network 103 can be a wireless network, a wired network or a combination thereof that can be implemented as one of the various types of networks, such as the Internet, an Intranet, a Local Area Network (LAN), a Wide Area Network (WAN), and the like.

Network security appliance 105 controls access to computers (e.g., computer A, computer B, computer C) within secured network 103. Accesses to the computers within secured network may come, for example, from another of the computers within secured network 105 and/or from other endpoint devices (e.g., endpoint device 125, endpoint device 126, endpoint device 127) that access secured network 105 via another network 110. Network 110 may be any communication systems or collection of communication systems that provide for network communications between respective networks. Those skilled in the art will appreciate that, network 110 can be a wireless network, a wired network or a combination thereof that can be implemented as one of the various types of networks, such as the Internet, an Intranet, a Local Area Network (LAN), a Wide Area Network (WAN), and the like.

Network security appliance 105 executes a robust login anomaly detection application 121. When executed, robust login anomaly detection application 121 accesses login database 122 to obtain communication logs between users, and based upon the communication logs generates a bipartite graph representing a communication pattern between users capable of accessing secured network 103. From this bipartite graph robust login anomaly detection application 121 develops a similarity score for every pair of users capable of accessing secured network 103. Robust login anomaly detection application 121 uses the aforementioned similarity scores to detect anomalous logins to or within secured network 103 indicative of a potential malware threat. The processes performed by robust login anomaly detection application 121 are more fully discussed below.

Figure 1B:
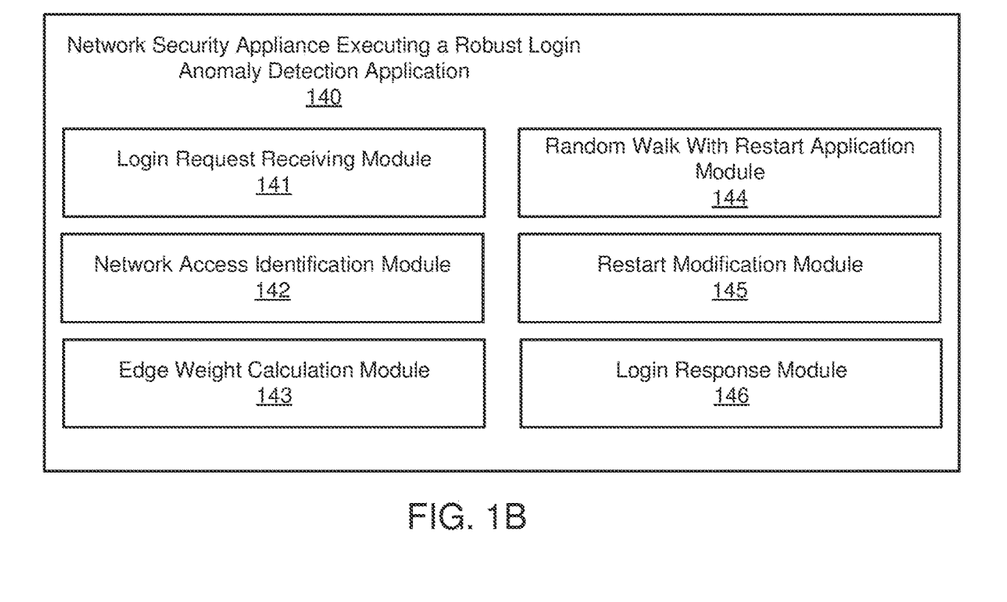

Turning to FIG. 1B, an implementation of a network security appliance executing a robust login anomaly detection application 140 (e.g., network security appliance 105 executing robust login anomaly detection application 121) is shown in accordance with some embodiments. As shown, network security appliance executing a robust login anomaly detection application 140 includes a login request receiving module 141, a network access identification module 142, an edge weight calculation module 143, a random walk with restart application module 144, a restart modification module 145, and a login response module 146.

Login request receiving module 141 is configured to receive a request to login to a device or service on a network supported by network security appliance executing a robust login anomaly detection application 140. The request to login identifies a requesting user and a requested access node. The requested access node may be one one of multiple access nodes in the network, and each of the access nodes is a network accessible device, and/or a network accessible service.

Network access identification module 142 is configured to identify multiple users in addition to the requesting user that have accessed the access node. Further, network access identification module 142 is configured to generate a bipartite graph including a first number of users and a second number of access nodes.

Edge weight calculation module 143 is configured to calculate new edge weights for the bipartite graph, where the edge weights include an edge weight for each user-access node pair, and wherein each computer-access node pair includes one user from the first number of users and one access node from the second number of computers, and to calculate updated edge weights based upon a combination of the new edge weights and prior edge weights. In some cases, the new edge weights are calculated as an estimated transition probability between respective elements in the bipartite graph. In various cases, the new edge weights are calculated based upon a first set of login data and the prior edge weights are based upon a second set of login data, and wherein the second set of login data preceded the first set of login data. Calculating the updated edge weights based upon the combination of the new edge weights and prior edge weights includes weighting the new edge weights relative to the prior edge weights.

Random walk with restart application module 144 is configured to apply a random walk with restart algorithm to edge weights between at least ten of the multiple users in addition to the requesting user and at least ten access nodes to determine a login attempt score for the request to login. In some cases, the random walk with restart algorithm includes a vector mask that at a defined time masks all users except for the requesting user.

Restart modification module 145 is configured to receive an anomaly indication that identifies a denied request to login as improperly denied, and based at least in part on the anomaly indication, modifies the vector mask to mask all users except for the requesting user and at least one other user. In some cases, the at least one other user adds at least one additional restart point in the random walk with restart algorithm.

Login response module 146 is configured to determine and report a granted login or a denied login. The determination is based at least in part upon the login attempt score. In some cases, denying the request to login based upon the login attempt score is done because the login attempt score is found to be dissimilar to prior login attempt scores between other users and the computer. In various cases, denying the request to login based upon the login attempt score is done because the login attempt score is less than a defined threshold.

Figure 1C:
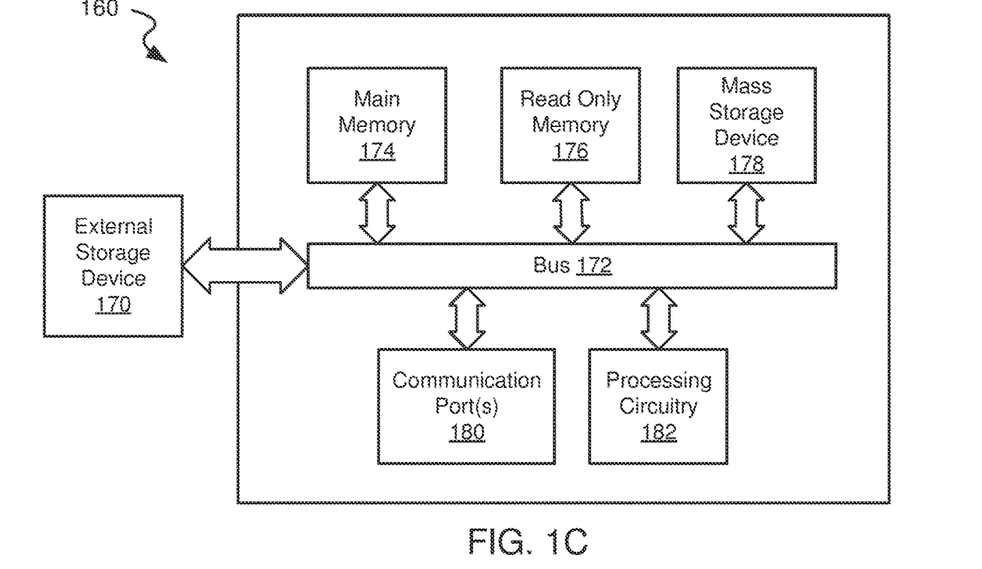

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 1010, and one or more processing resources (e.g., processing circuitry 182). In one embodiment, computer system 160 may represent some portion of network security appliance 105.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 760 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g. start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc—Rewritable (CD-RW), Digital Video Disk-Read Only Memory (DVD-ROM). Components described above are meant only to show various possibilities. In no way should the aforementioned example computer system limit the scope of the present disclosure.

Figure 2:
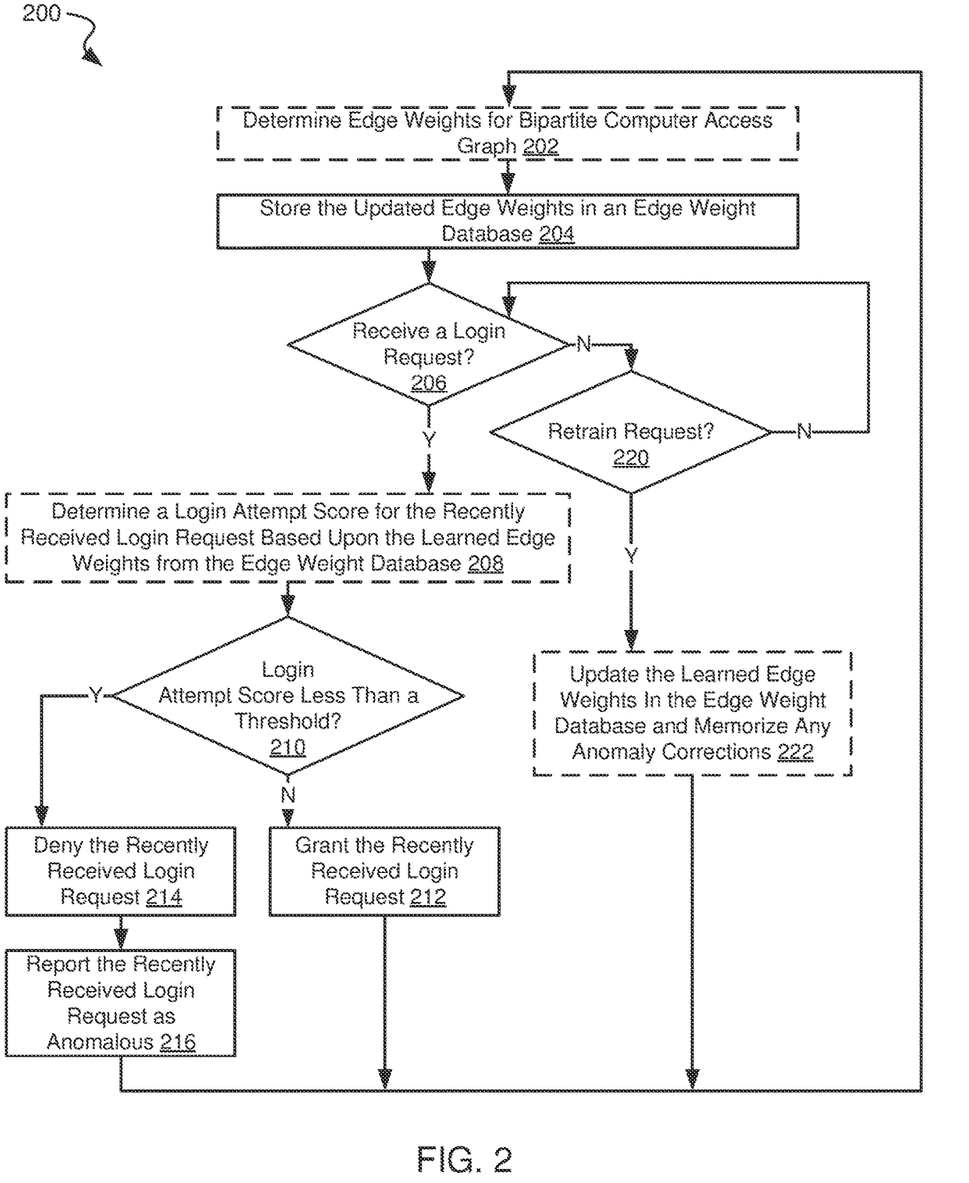
FIG. 2 is a flow diagram showing a method in accordance with some embodiments for robust login anomaly detection based upon similarity scores between user pairs in a network environment.

Turning to FIG. 2, a flow diagram 200 shows a method in accordance with some embodiments for robust login anomaly detection based upon similarity scores between user pairs in a network environment. Following flow diagram 200, edge weights for a bipartite computer access graph are determined (block 202). Block 202 is shown in dashed lines as it is implemented using a method similar to that discussed in relation to FIG. 3.

Figure 3A:
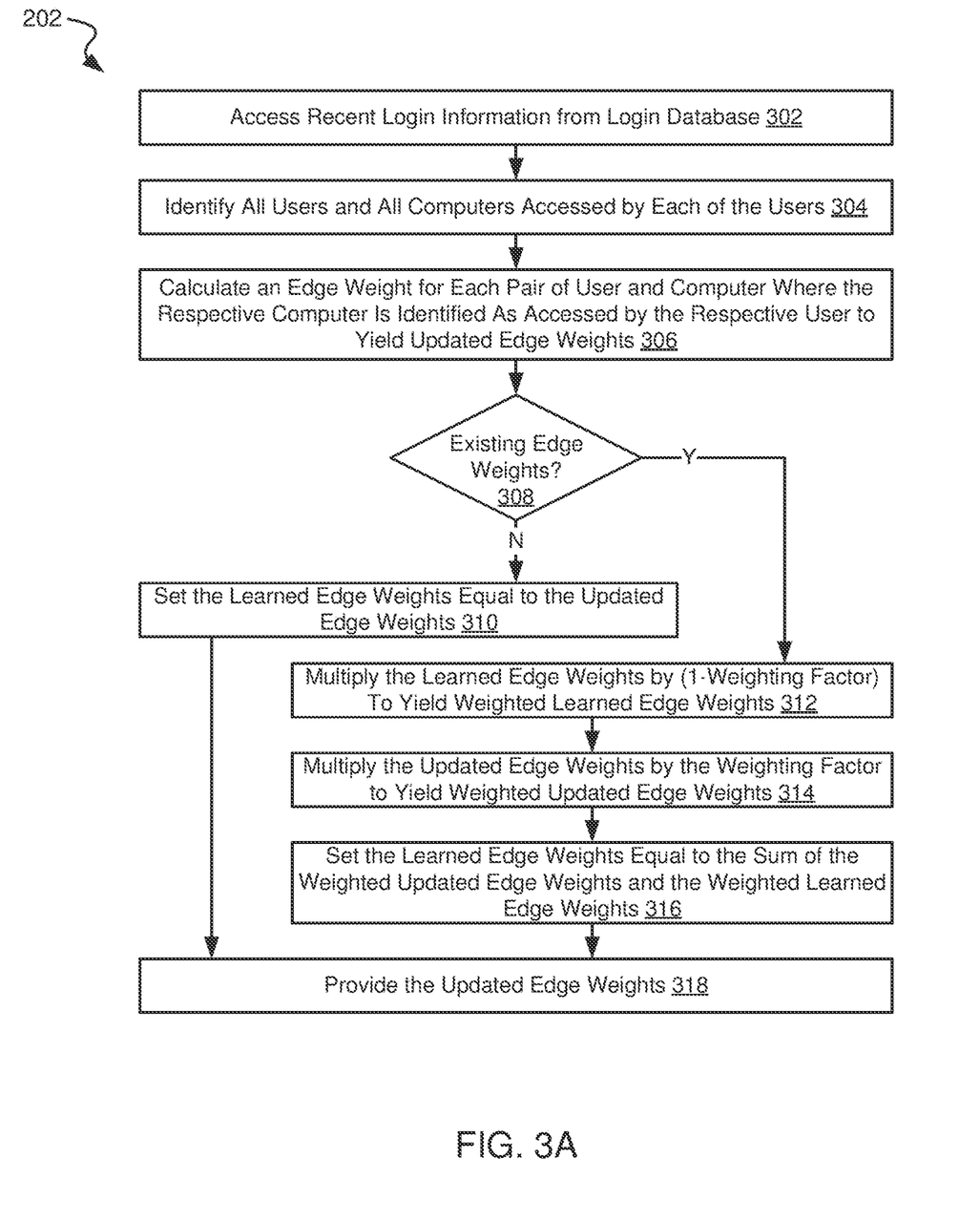
FIGS. 3A-3B show a process for generating a bipartite graph of user communications in a network environment for use in relation to one or more embodiments.
Figure 3B:
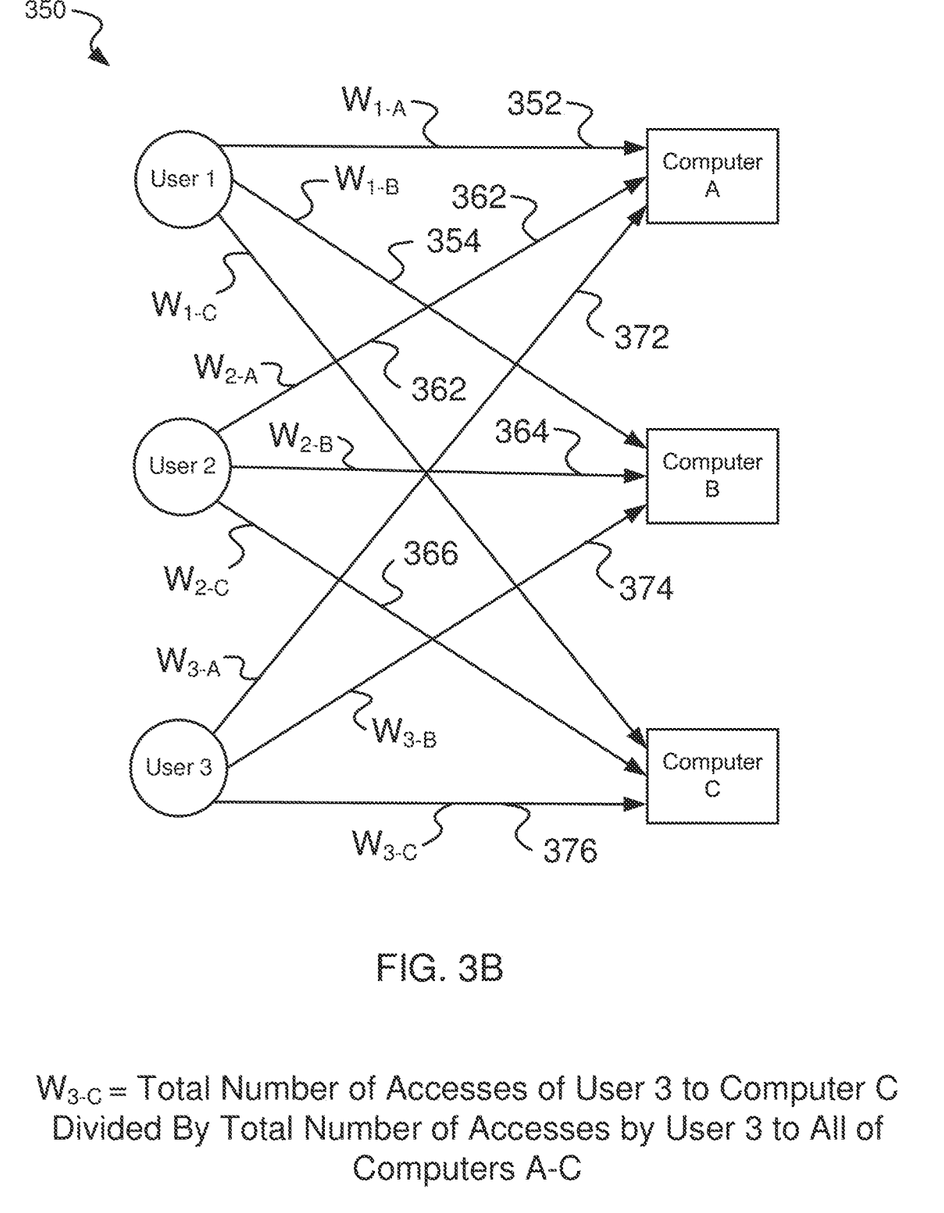

Turning to FIG. 3 and following flow diagram 202 that shows a method for the block of the same number in FIG. 2, recent login information (e.g., a system log) is accessed (block 302). Using the embodiment discussed above in relation to FIG. 1A, this may include network security appliance 105 accessing login database 122. From this login information (block 302), all users and all computers that are accessed by each other are identified (block 304). This identification results in a bipartite graph with users on one side and computers on the other side. Turning to FIG. 3B a simple example of such a bipartite graph 350 is shown for three users (i.e., user 1, user 2, user 3) and three computers (i.e., computer A, computer B, computer C). Bipartite graph 350 shows connections (i.e., straight line 352 between user 1 and computer A, straight line 354 between user 1 and computer B, straight line 356 between user 1 and computer C, straight line 362 between user 2 and computer A, straight line 364 between user 2 and computer B, straight line 366 between user 2 and computer C, straight line 372 between user 3 and computer A, straight line 374 between user 3 and computer B, and straight line 376 between user 3 and computer C,) between each of the users and each of the computers. Again, bipartite graph 350 is simplified for explanation, but one of ordinary skill in the art will recognize that thousands or more users and computers may be included in a given bipartite graph in accordance with different embodiments.

Returning to FIG. 3A, with all of the users and computers for the bipartite graph identified (block 304), edge weights for each of the connections in the bipartite graph are calculated (block 306). Again turning to FIG. 3B, an edge weight ($W_{1-A}$) is calculated for connection 352, an edge weight ($W_{1-B}$) is calculated for connection 354, an edge weight ($W_{1-C}$) is calculated for connection 356, an edge weight ($W_{2-A}$) is calculated for connection 362, an edge weight ($W_{2-B}$) is calculated for connection 364, an edge weight ($W_{2-C}$) is calculated for connection 366, an edge weight ($W_{3-A}$) is calculated for connection 372, an edge weight ($W_{3-B}$) is calculated for connection 374, and an edge weight ($W_{3-C}$) is calculated for connection 376.

The edge weights are calculated using estimated transition probabilities. As an example, if a user A has accessed a computer B forty (40) times and has accessed a computer C sixty (60) times, the edge weight between A and B will be (0.4=[40/(60+40)]), and the edge weight between A and C will be (0.6=[40/(60+40)]). Using this information, similarity between nodes is calculated using a random walk with restart approach as is known in the art. More information about a random walk with restart approach for calculating the aforementioned edge weights is discussed in Sun, Jimeng, et al. "Neighborhood formation and anomaly detection in bipartite graphs." Fifth IEEE International Conference on Data Mining (ICDM'05), IEEE, 2005. The aforementioned reference is incorporated herein by reference for all purposes. In short, the concept of a random walk defines a similarity score among nodes as the steady state probability. Thus, assume one starts random process from a given node X and jumps to all other connected nodes with a probability that is proportional to edge weights. The concept continues by moving from one node to the other for a very long time, and then the process is stopped and the current location is captured. This is repeated from the beginning for many times, and each time the location where the process is stopped is captured. The steady state probability for each node is defined as the frequency of landing in that particular node. Random walk uses this steady state probability as a measure for closeness of any node with the given node V. Intuitively, the more paths exist between node V and any other node, the closer those two nodes will be since in the long run that is where the random walk will end.

The important property about random walk is that it captures a global property of the graph. In contrast, other measures such as Jaccard's coefficient focuses only on local properties of the graph. In other words, if two nodes have no common neighbors, their Jaccard's coefficient will be zero while they might have a lot of paths to one another through uncommon neighbors that can be captured by random walk.

One downside of the aforementioned random walk approach is that as the random process moves in time, it can move farther and farther from the beginning node (i.e., it loses its closeness from the initial node). To mitigate this propensity to continue farther and farther, a restart property is added to the concept of the random walk. More particularly, while the random process is proceeding (i.e., moving from node to node), at each node, there are two options, 1) with some probability of restart (i.e., c), go back to the initial starting node, or, 2) with another probability (i.e., 1-c), continue the process of the random walk (i.e., move to other nodes with probability proportional to respective edge weights). Obliviously, if we set the probability of restart equal to zero (i.e., c=0), the result is the random walk without restart. By increasing the probability of restart (i.e., c), nodes in the bipartite graph with shorter initial paths to the initial node will intuitively have higher steady state probabilities. Such an approach of adding a restart probability to a random walk concept results in a compromise between global and local structure of the bipartite graph.

The similarity between nodes can be calculated by iteratively solving the following equation to yield $P_A$ (i.e., solving random walk with restart) which is a matrix of normalized edge weights for the connections in the bipartite graph:

$$u_a = (1-c)P_A u_a + cq_a,$$

where $u_a$ is a vector that shows similarity between node a with all other nodes, $q_a$ is a query vector that is set to a "one" for a node of interest and "zero" for all other nodes, and c is the aforementioned probability of restart. Returning to FIG. 3A, the edge weights (i.e., matrix $P_A$) for the recent login information are referred to as updated edge weights.

The updated edge weights (i.e., matrix $P_A$) is done in accordance with the following example where it is assumed that there are three users (a, b, c) and two computers (d, e) from historical data. Three users (a, b, f) and two computers (e,h) are included in new data. $P_A$ in the first case (i.e., the prior $P_A$ or $P_A\_P$) was used in a 5×5 matrix (i.e., (3+2)×(3+2)). The new data has a new user, f, that has not been seen before and also a new computer, h, that has not been seen before. Because of these new elements (user and/or computer), a new $P_A$ matrix (i.e., $P_A\_N$) is created, and based upon this an updated $P_A$ matrix (i.e., $P_A\_U$) is calculated. In this example, the updated $P_A$ matrix is a 7×7 matrix including four users (a, b, c, f) and three computers (d, e, h).

Figure 7:
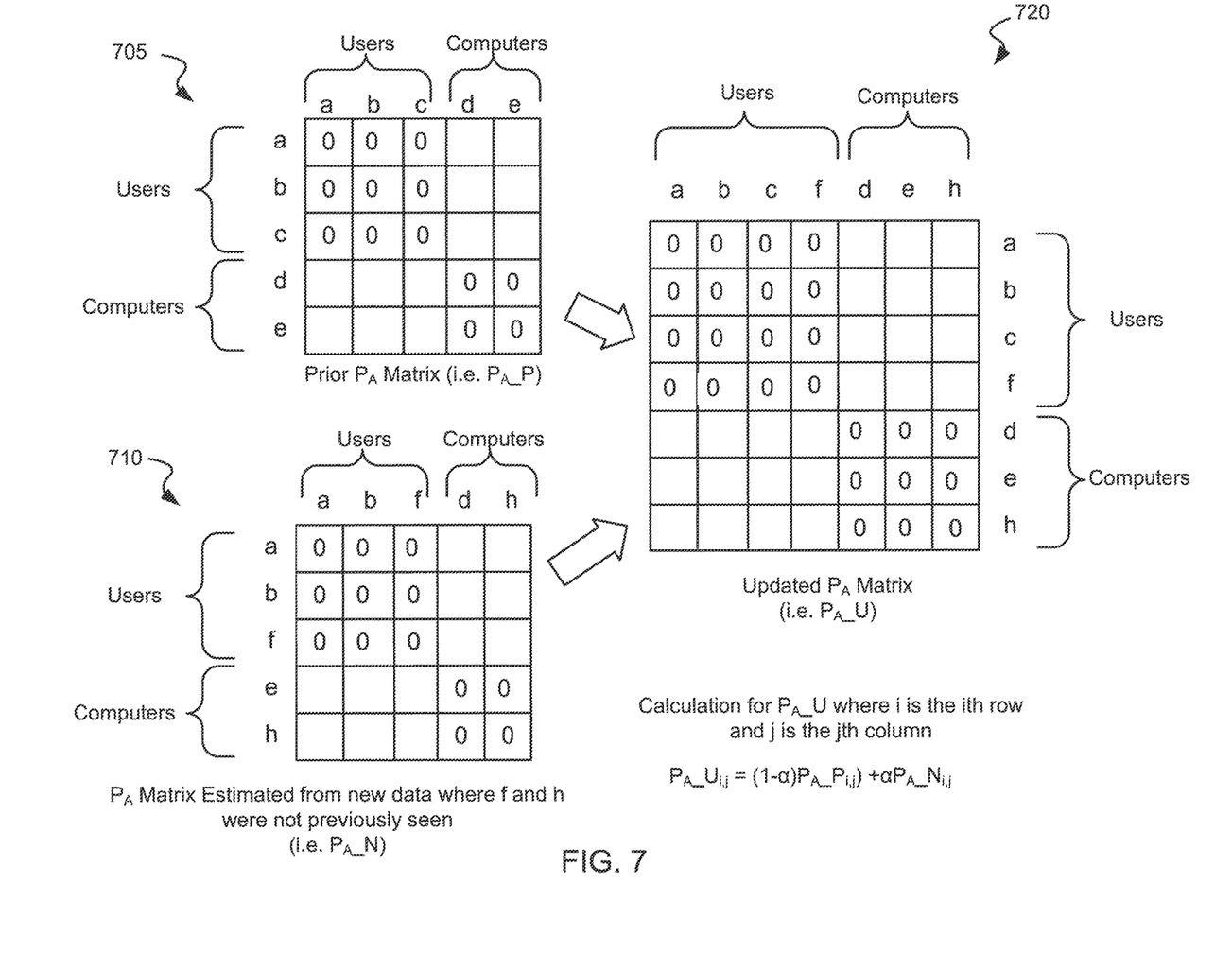
FIG. 7 shows an example, of calculated updated edge weights using a combination of historical edge weights in a prior $P_A$ matrix and edge weights from newly received data arranged in a new $P_A$ matrix.

The elements in the aforementioned $P_A$ matrices are calculated as shown in FIG. 7. As shown in FIG. 7, a 5×5 $P_A$ matrix 705 for users a, b, c and computers d, e is shown. This corresponds to the historical data that was used to calculate the prior $P_A$ matrix (i.e., $P_A\_P$). Of note all of the computer-Computer locations are zero, and all of the user-user locations are zero. Another 5×5 $P_A$ matrix 710 for users a, b, f and computers d, his shown. This corresponds to the newly received data that is used to calculate a new prior $P_A$ matrix (i.e., $P_A\_N$). Of note all of the computer-Computer locations are zero, and all of the user-user locations are zero. Information from these two matrices is used to calculate the updated $P_A$ matrix (i.e., $P_A\_U$) 725 using the following equation:

$$P_A\_U_{i,j} = ((1-\alpha)P_A\_P_{i,j})\alpha P_A\_N_{i,j},$$

where i is the $i^{th}$ row, and j is the $j^{th}$ column of the matrix. If either $P_A\_P_{i,j}$ or $P_A\_N_{i,j}$ does not exist, then it is set to zero for that location. As an example, where $P_A\_P_{h,a}$ does not exist because h was not seen in the historical data (i.e., there was no h in $P_A\_P_{i,j}$), then $P_A\_P_{h,a}$ is set to zero. $P_A\_N_{i,j}$ is column normalized (i.e., the sum of all elements of a given column is one (1)). This allows for normalizing then updated $P_A$ matrix.

With the updated edge weights calculated (block 306), it is determined whether there are edge weights that already existed (i.e., updated edge weights are non-zero) (block 308). Where there are no existing edge weights (block 308), the updated edge weights are set equal to the updated edge weights (block 310). Such updated edge weights are those that will be used in calculating similarity scores used to detect login anomalies.

Alternatively, where there are existing edge weights (i.e., the updated edge weights are non-zero) (block 308), the existing edge weights are multiplied by (1—Weighting Factor) to yield weighted updated edge weights (block 312). Similarly, the updated edge weights are multiplied by the Weighting Factor to yield weighted updated edge weights (block 314). The updated edge weights are then set equal to the sum of the weighted updated edge weights and the weighted updated edge weights (block 316). By changing the value of the weighting factor, the importance of more recent edge weights can be increased relative to earlier edge weights making the system more flexible in its ability to grow with the changes in legitimate user communications occurring in a network environment.

The updated edge weights are provided back to the process of FIG. 2 (block 318). Returning to FIG. 2, the updated edge weights are stored to an edge weight database (block 204). As more fully described below, these edge weights are used to calculate similarity scores used to identify login anomalies. It is determined whether a login request has been received (block 206). Such a login request may be any request to access a computer or other device or service that is controlled by some type of authentication. As one example, a login request may include a username and a password. Based upon the disclosure provided herein, one of ordinary skill in the art will recognize a variety of login requests that may be used or detected in accordance with different embodiments.

Where a login request has been received (block 206), a login attempt score is determined for the recently received login request (block 208). This login attempt score is based upon node similarity that is a function of edge weights related by the equation:

$$u_a = (1-c)P_A u_a + cq_a.$$

Figure 4A:
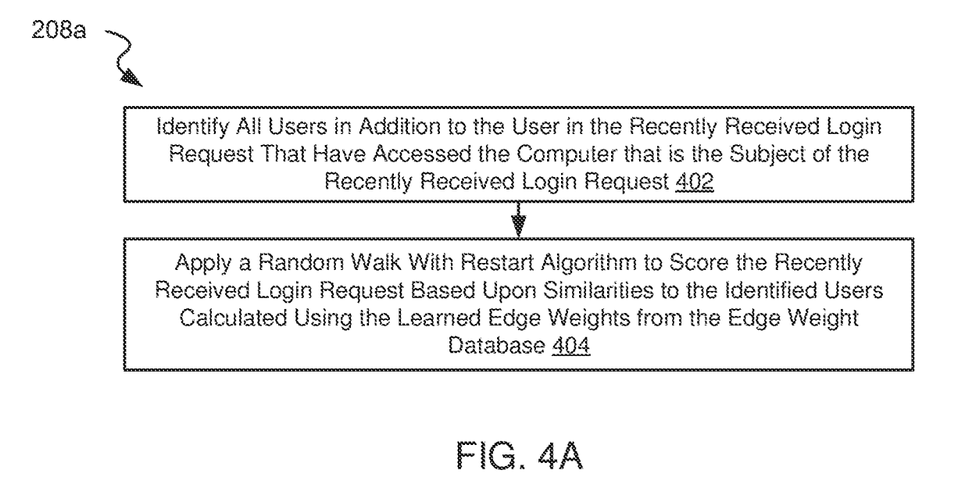
FIGS. 4A-4C show different processes for generating similarity scores between users in a communication network in accordance with various embodiments.

Turning to FIG. 4A and following flow diagram 208a that shows a method for the block 208 (the same number) in FIG. 2, all users that have accessed (i.e., attempted to log into) the computer, device, or service that is the subject of the recently received login request are identified (block 402). The user that is accessing the computer, device, or service that is the subject of the recently received login request is included as one or the users in the bipartite graph and identified. A random walk with restart algorithm is applied to score (i.e., calculate similarity scores between nodes in the bipartite graph) the recently received login request based upon similarities between the user that is associated with the recently received login request and all other users that were identified as accessing the computer, device, or service that is the subject of the recently received login request (block 404). The similarity scores correspond to each pair of users using the updated edge weights accessed from the edge weight database.

The similarity scores between the user that is associated with the recently received login request and all other users that were identified as accessing the computer, device, or service that is the subject of the recently received login request is obtained by accessing the previously calculated $u_a$ values.

Figure 4B:
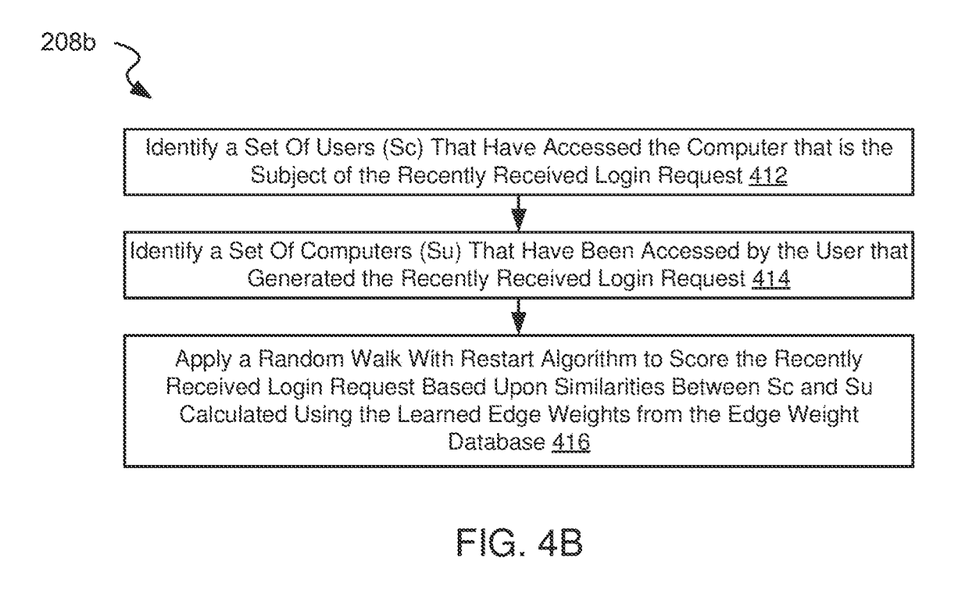
Figure 4C:
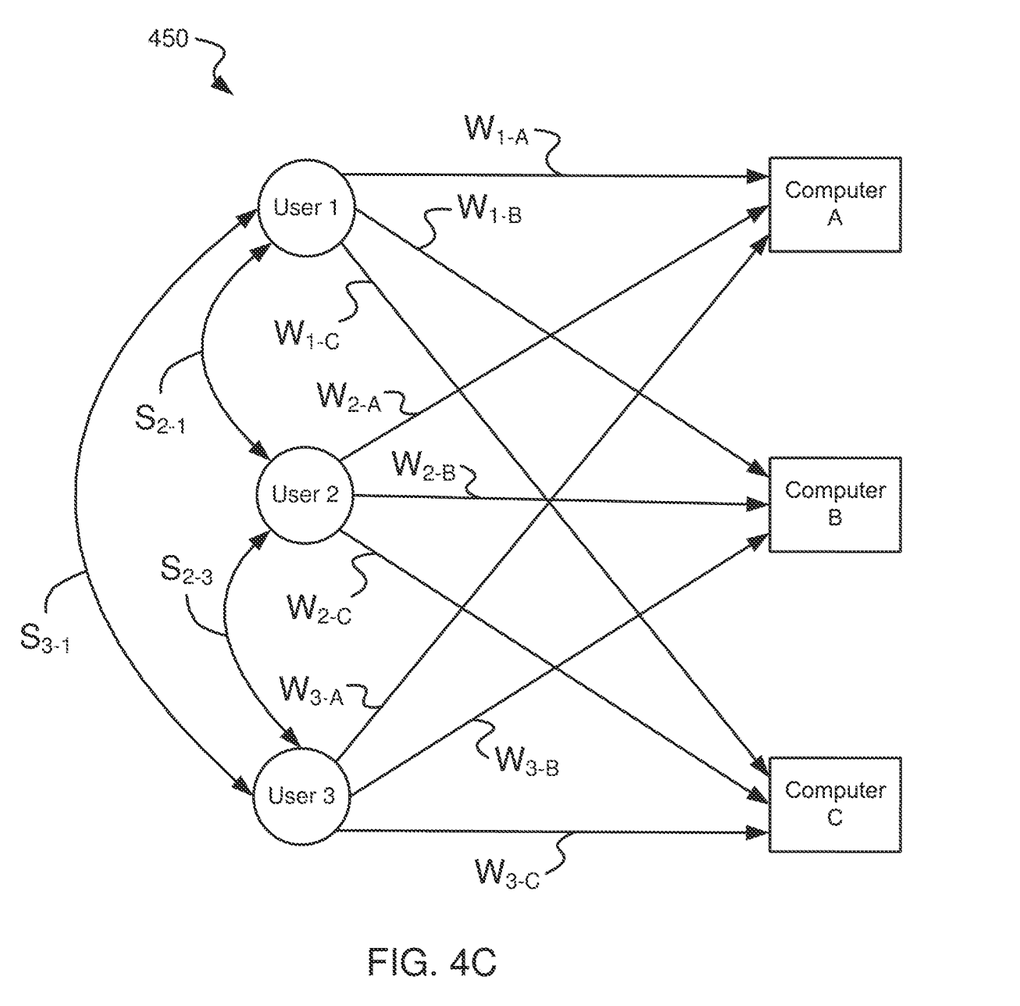

Turning to FIG. 4C, a graphical representation of a bipartite graph 450 including the same nodes and edge weights as in bipartite graph 350, but augmented to show similarities between user nodes (i.e., a similarity score between user 1 and user 3 ($S_{3-1}$), a similarity score between user 1 and user 2 ($S_{2-1}$), and a similarity score between user 2 and user 3 ($S_{2-3}$)). In a case where user 1 in bipartite graph is associated with the recently received login, the determined similarity scores in the vector $u_a$ will include $S_{3-1}$ and $S_{2-1}$.

Turning to FIG. 4B and following flow diagram 208b that shows an alternative method for the block 208 (the same number) in FIG. 2, a set of users (Sc) that have accessed the computer that is the subject of the recently received login request are identified (block 412). Thus, for example, using bipartite graph 450 of FIG. 4C, where computer A is the subject of the recently received login request, each of user 1, user 2, and user 3 are included in the identified set of users where all of the aforementioned users have accessed computer A.

Returning to FIG. 4B, a set of computers, devices, and/or services (Su) that have been accessed by the user that is the subject of the recently received login request are identified (block 414). Thus, for example, using bipartite graph 450 of FIG. 4C, where user 1 is the subject of the recently received login request, each of computer A, computer B, and computer C are included in the identified set of computers, devices, and/or services where all of the aforementioned have been accessed by user 1.

Returning to FIG. 4B, a random walk with restart algorithm is applied to score (i.e., calculate similarity scores between nodes in the bipartite graph) the recently received login request based upon similarities between the aforementioned Su and Sc (block 416). The result is similarity scores corresponding to each pair of users using the updated edge weights accessed from the edge weight database.

Calculating the similarity scores between Su and Sc is done by solving the following equation for $u_a$:

$$u_a = (1-c)P_A u_a + cq_a^2.$$

Again, $P_A$ is a matrix of all of the edge weights between users and accessed devices (e.g., computers, devices, or services) that was determined as discussed above in relation to block 202 of FIG. 2; $q_a$ is a query vector that is set to a "one" for the node (i.e., another node) in the bipartite graph and "zero" for all other nodes; and c is the aforementioned probability of restart. The vector $u_a$ is a vector of similarity scores including similarity scores between the user that is associated with the recently received login request and all other users that were identified as accessing the computer. This vector of similarity scores is returned to block 210 of FIG. 2.

Returning to FIG. 2, it is determined if the returned similarity scores are less than a defined threshold (block 210). The threshold and/or which of the similarity scores qualify may be modified to change the strictness for identifying an anomalous login attempt. For example, in a relatively strict scenario the lowest similarity score in the returned vector of similarity scores is compared with the threshold to determine whether the recently received login request will be deemed an anomalous login attempt. As another less strict scenario, a weighted average or median of all of the similarity scores in the returned vector of similarity scores is compared with the threshold to determine whether the recently received login request will be deemed an anomalous login attempt. In an even less strict scenario, the highest similarity score in the returned vector of similarity scores is compared with the threshold to determine whether the recently received login request will be deemed an anomalous login attempt. Based upon the disclosure provided herein, one of ordinary skill in the art will recognize a variety of values for the defined threshold and/or different levels of strictness that can be achieved by using different combinations of the similarity scores included in the returned vector that may be used in relation to different embodiments. In some embodiments, the defined threshold may be user programmable.

Where it is determined that a selected one of the similarity scores and/or a combination of the similarity scores is less than the defined threshold (block 210), the recently received login request is denied (block 214) and the recently received login request is identified as an anomalous login request (block 216). Alternatively, where it is determined that the selected one of the similarity scores and/or a combination of the similarity scores is not less than the defined threshold (block 210), the recently received login request is granted (block 212).

Figure 6:
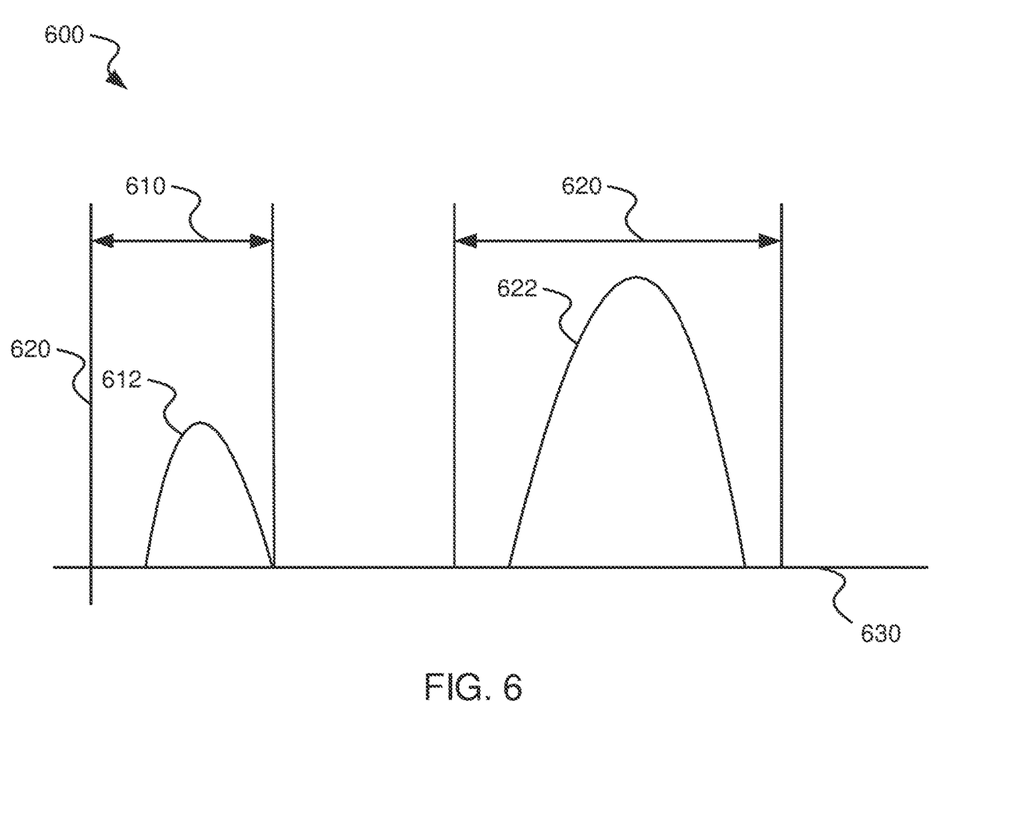
FIG. 6 is a graph of density of similarity scores verses similarity scores possible in accordance with different embodiments.

Turning to FIG. 6, a graph 600 of density 620 verses similarity scores 630 is shown. As shown a distribution 612 of similarity scores that appear anomalous occur in a suspicious login region 610, and another distribution 622 of similarity scores that appear legitimate occur in a legitimate login region 620. As shown, the difference between suspicious login region 610 and legitimate login region 620 is significant. In such a case, it is possible to program the defined threshold as somewhere between the regions. In one particular embodiment, the defined threshold is programmed to be just greater than the highest expected values in suspicious login region 610.

Returning to FIG. 2, where a login request has not been received (block 206) it is determined whether a retrain request has been received (block 220). A retrain request may be received from, for example, a user requesting and retraining of the model (e.g., an update of the bipartite graph and edge weights) used to detect anomalous logins. As another example, a retrain request may be automatically received based upon a schedule (e.g., once per week). Based upon the disclosure provided herein, one of ordinary skill in the art will recognize a variety of mechanisms by which a retraining request may be received in relation to different embodiments. Where a retrain request is received (block 220), the updated edge weights are updated in the edge weight database and any anomaly corrections identified by a user are memorized (block 222).

Figure 5:
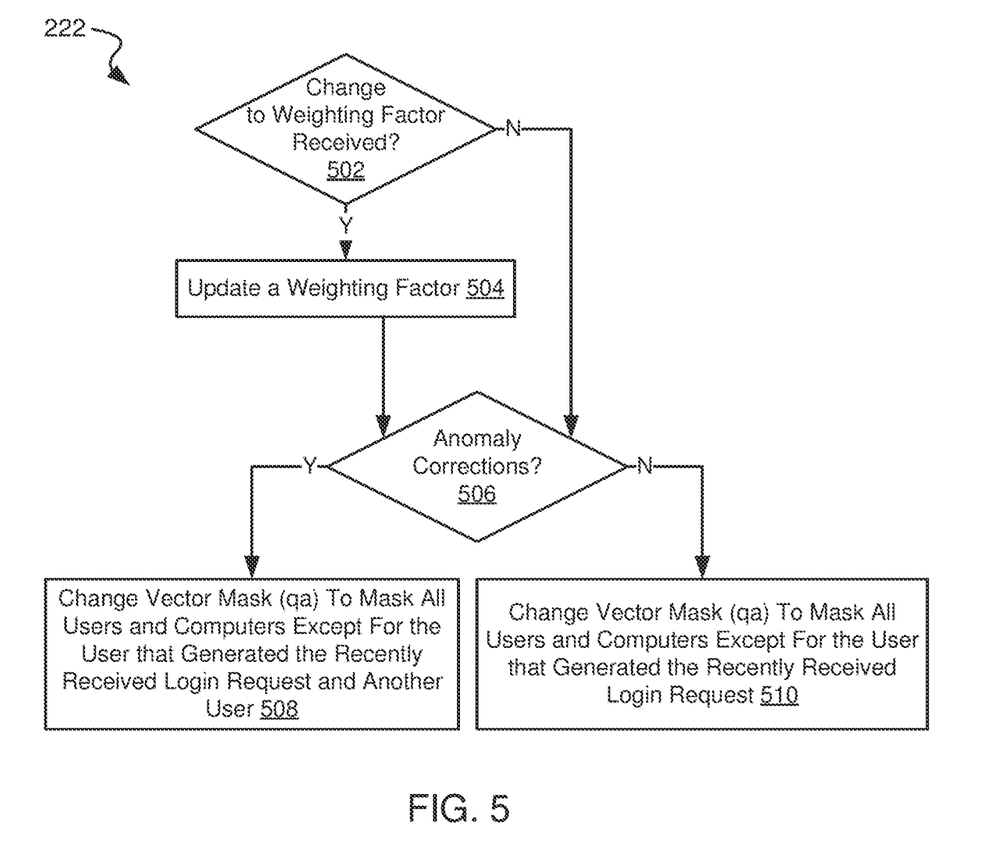
FIG. 5 is a flow diagram showing a method in accordance with some embodiments for tailoring weighting factors and random walk restart controls.

Turning to FIG. 5 and following flow diagram 222 that shows a method for the block 208 (the same number) in FIG. 2, it is determined whether a change to a weighting factor has been received (block 502). The weighting factor is a user programmable value that is used to weight newly received login information in the form of edge weights relative to earlier login information also in the form of edge weights. Where a new weighting factor has been received (block 502), it is updated in memory (block 504). This is the weighting factor that is used as discussed above in relation to blocks 312-316 of FIG. 3. By making the weighting factor higher, emphasis is placed on the more recent login information at the expense of earlier login information. Similarly, the emphasis on the more recent login information is reduced as the weighting factor is reduced. One way to retrain is to simply calculate edge weights in the bipartite graph using only the most recent login information (i.e., selecting a weighting factor of 1.0). Such an approach will suffer from robustness against adversarial attack as in the span of a few days, a large body of login data may be created by an adversary. Thus, what would normally be identified as anomalous may start to appear normal. To avoid this, a lower weighting factor (less than 1.0) is used to limit the impact of illegitimate login attempts. Use of too low of a weighting factor does not allow for proper consideration of legitimate changes in logins and thus potentially results in a relatively high rate of false positive indications of anomalous logins.

It is determined whether a user (e.g., a system administrator) has provided an alert of a false positive indication of an anomalous login attempt (block 506). Such false positives result because users in a particular network are not close (i.e., similar) to each other. To increase the similarity in the particular network, the random walk algorithm is modified to include the restart (i.e., to become a random walk with restart algorithm). To do this, the vector mask ($q_a$) discussed above in relation to FIG. 3A is changed to mask all nodes (users, device, computers, and/or services) except for the user associated with the recently received login request and at least one other node (block 508). The other node that is unmasked operates as the restart. In some embodiments, the other node is selected as a node within the network that is protected using the anomalous login detection algorithm. As such, during the random walk process: (1) with a probability of (1-c) nodes will continue the process similar to random walk, or (2) the random walk process jumps back to initial node or the nodes in the particular network a probability of (c/n) where n is the number of nodes in the particular network. Such an approach increases the frequency of landing on nodes in the particular network which will increase the steady state probability and ultimately the resulting similarity score. Alternatively, where no corrections for previously identified false positives have been received (block 506), the vector mask ($q_a$) discussed above in relation to FIG. 3A is changed to mask all nodes (users, device, computers, and/or services) except for the user associated with the recently received login request (block 510). In some embodiments, the identified false positives are memorized (i.e., white listed) to provide additional assurance that the will not generate another false positive indication of an anomalous login. The updated weighting factor and/or vector mask are provided to block 202 of FIG. 2 where they are used in calculating updated edge weights to complete the retraining.

In conclusion, the present disclosure provides for novel systems, devices, and methods. While detailed descriptions of one or more embodiments have been given above, various alternatives, modifications, and equivalents will be apparent to those skilled in the art. Therefore, the above description should not be taken as limiting the scope of the invention, which is defined by the appended claims.

What is claimed is:

1. A computer-implemented method for reducing the spread of malware between network devices in a data network, the method comprising:
   receiving, by a processor, a request to login to an access node of the data network, wherein the request to login identifies a requesting user;
   identifying, by the processor, multiple users in addition to the requesting user that have accessed the access node;
   applying, by the processor, a random walk with restart algorithm to edge weights between multiple users in addition to the requesting user and multiple corresponding access nodes of the data network to determine a login attempt score for the request to login;
   denying, by the processor, the request to login based at least in part upon the login attempt score,
   receiving, by the processor, an anomaly indication, wherein the anomaly indication identifies the denied request to login as improperly denied; and
   based at least in part on the anomaly indication, modifying the vector mask to mask all users except for the requesting user and at least one other user.

2. The method of claim 1, wherein the access node is one of multiple access nodes in a network, and wherein each of the access nodes is selected from a group consisting of: a network accessible device, and a network accessible service.

3. The method of claim 1, wherein the random walk with restart algorithm includes a vector mask, and wherein the vector mask initially masks all users except for the requesting user.

4. The method of claim 1, wherein the at least one other user adds at least one additional restart point in the random walk with restart algorithm.

5. The method of claim 1, the method further comprising:
   generating, by the processor, a bipartite graph including a first number of users and a second number of access nodes;
   calculating, by the processor, new edge weights for the bipartite graph, wherein the edge weights include an edge weight for each user-access node pair, and wherein each computer-access node pair includes one user from the first number of users and one access node from the second number of computers; and
   calculating, by the processor, updated edge weights based upon a combination of the new edge weights and prior edge weights.

6. The method of claim 5, wherein the new edge weights are calculated as an estimated transition probability between respective elements in the bipartite graph.

7. The method of claim 5, wherein the new edge weights are calculated based upon a first set of login data and the prior edge weights are based upon a second set of login data, and wherein the second set of login data preceded the first set of login data.

8. The method of claim 5, wherein calculating the updated edge weights based upon the combination of the new edge weights and prior edge weights includes weighting the new edge weights relative to the prior edge weights.

9. The method of claim 1, wherein denying the request to login based upon the login attempt score is done because the login attempt score is found to be dissimilar to prior login attempt scores between other users and the computer.

10. The method of claim 1, wherein denying the request to login based upon the login attempt score is done because the login attempt score is less than a defined threshold.

11. A system for reducing the spread of malware between network devices in a network, the system comprising:
a processing resource;
a non-transient computer readable medium coupled to the processing resource and having stored therein instructions that when executed by the processing resource cause the processing resource to perform the following method:
receiving a request to login to an access node, wherein the request to login identifies a requesting user;
identifying multiple users in addition to the requesting user that have accessed the access node;
applying a random walk with restart algorithm to edge weights between multiple users in addition to the requesting user and multiple corresponding access nodes of the data network to determine a login attempt score for the request to login;
denying the request to login based at least in part upon the login attempt score being dissimilar to prior login attempt scores between other users and the computer,
receiving an anomaly indication, wherein the anomaly indication identifies the denied request to login as improperly denied; and
based at least in part on the anomaly indication, modifying the vector mask to mask all users except for the requesting user and at least one other user.

12. The system of claim 11, wherein the access node is one of multiple access nodes in a network, and wherein each of the access nodes is selected from a group consisting of: a network accessible device, and a network accessible service.

13. The system of claim 11, wherein the random walk with restart algorithm includes a vector mask, and wherein at a first time the vector mask initially masks all users except for the requesting user.

14. The system of claim 11, wherein the at least one other user adds at least one additional restart point in the random walk with restart algorithm.

15. The system of claim 11, wherein the non-transient computer readable medium further has stored therein instructions that when executed by the processing resource cause the processing resource to perform the following method comprising:
generating a bipartite graph including a first number of users and a second number of access nodes;
calculating new edge weights for the bipartite graph, wherein the edge weights include an edge weight for each user-access node pair, and wherein each computer-access node pair includes one user from the first number of users and one access node from the second number of computers;
calculating updated edge weights based upon a combination of the new edge weights and prior edge weights.

16. The system of claim 15, wherein the new edge weights are calculated as an estimated transition probability between respective elements in the bipartite graph.

17. The system of claim 15, wherein calculating the updated edge weights based upon the combination of the new edge weights and prior edge weights includes weighting the new edge weights relative to the prior edge weights.

18. A non-transient computer readable medium having stored therein instructions that when executed by the processing resource cause the processing to perform a method for reducing the spread of malware between network devices in a network, comprising the steps of:
receiving a request to login to an access node, wherein the request to login identifies a requesting user;
identifying multiple users in addition to the requesting user that have accessed the access node;
applying a random walk with restart algorithm to edge weights between multiple users in addition to the requesting user and multiple corresponding access nodes of the data network to determine a login attempt score for the request to login;
denying the request to login based at least in part upon the login attempt score being dissimilar to prior login attempt scores between other users and the computer,
receiving an anomaly indication, wherein the anomaly indication identifies the denied request to login as improperly denied; and
based at least in part on the anomaly indication, modifying the vector mask to mask all users except for the requesting user and at least one other user.

* * * * *